United States Patent [19]
Hahn et al.

[11] Patent Number: 5,270,456
[45] Date of Patent: Dec. 14, 1993

[54] AZO DYES WITH A2-AMINOTHIOPHENE DYE AZO COMPONENT AND A COUPLING COMPONENT AND COUPLING COMPONENT OF THE DIPHENYLAMINE SERIES

[75] Inventors: Erwin Hahn, Heidelberg; Guenter Hansen, Ludwigshafen; Karl-Heinz Etzbach, Frankenthal; Helmut Reichelt, Neustadt; Ernst Schefczik, Ludwigshafen; Sabine Greuttner, Mutterstadt; Helmut Degen, Frankenthal, all of Fed. Rep. of Germany

[73] Assignee: BASF Aktiengesellschaft, Ludwigshafen, Fed. Rep. of Germany

[21] Appl. No.: 727,881

[22] Filed: Jul. 10, 1991

[30] Foreign Application Priority Data

Jul. 10, 1990 [DE] Fed. Rep. of Germany ....... 4021960

[51] Int. Cl.$^5$ .................. C09B 29/033; C09B 29/09; D06P 1/18; D06P 3/54
[52] U.S. Cl. .................... 534/794; 534/588; 534/598; 534/753; 534/774; 8/532; 8/662; 8/922
[58] Field of Search .................... 534/794, 753

[56] References Cited

U.S. PATENT DOCUMENTS

| | | | |
|---|---|---|---|
| 3,640,996 | 2/1972 | Sturm et al. | 534/794 X |
| 4,321,055 | 3/1982 | Hansen et al. | 8/639 |
| 4,810,783 | 3/1989 | Leverenz | 534/794 X |
| 4,874,392 | 10/1989 | Henzi | 534/753 X |
| 4,952,681 | 8/1990 | Hansen et al. | 534/794 X |

FOREIGN PATENT DOCUMENTS

| | | |
|---|---|---|
| 30695 | 6/1981 | European Pat. Off. ............ 534/794 |
| 0035671 | 9/1981 | European Pat. Off. . |
| 0193885 | 9/1986 | European Pat. Off. . |
| 0237910 | 9/1987 | European Pat. Off. . |
| 201896 | 5/1990 | . |
| 381974 | 8/1990 | European Pat. Off. . |
| 2109756 | 9/1972 | Fed. Rep. of Germany . |
| 54-27077 | 3/1979 | Japan ................................. 534/794 |
| 55-92766 | 7/1980 | Japan ................................. 534/794 |
| 1202984 | 8/1970 | United Kingdom . |
| 2163768 | 3/1986 | United Kingdom . |

Primary Examiner—Mary C. Lee
Assistant Examiner—Fiona T. Powers
Attorney, Agent, or Firm—Oblon, Spivak, McClelland, Maier & Neustadt

[57] ABSTRACT

Thiopheneazo dye I which are chiefly useful as disperse dyes for dyeing textile material, in particular polyesters, have the formula

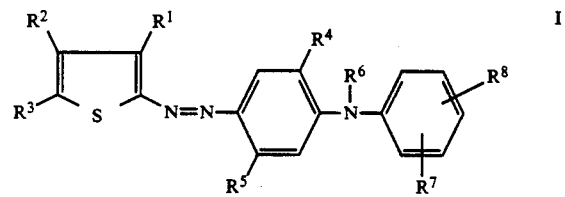

where the substituents are as defined in the description.

4 Claims, No Drawings

AZO DYES WITH A 2-AMINOTHIOPHENE DYE AZO COMPONENT AND A COUPLING COMPONENT AND COUPLING COMPONENT OF THE DIPHENYLAMINE SERIES

The present invention relates to a novel thiopheneazo dye of the general formula I

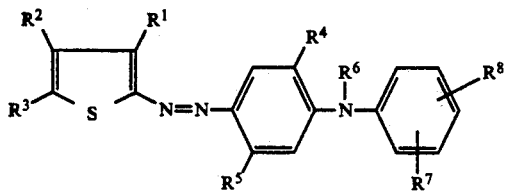

in which the substituents have the following meanings:
$R^1$ is cyano or $C_1$-$C_4$-alkoxycarbonyl,
$R^2$ is halogen, $C_1$-$C_6$-alkyl whose carbon chain may be interrupted by one or two oxygen atoms in ether function, $C_1$-$C_6$-alkoxy or $C_1$-$C_6$-alkylthio which may each be phenyl-substituted, or phenylthio or phenylsulfonyl, which may each be substituted by halogen, $C_1$-$C_4$-alkyl or $C_1$-$C_4$-alkoxy,
$R^3$ is cyano, $C_1$-$C_4$-alkanoyl, benzoyl, $C_1$-$C_4$-alkylsulfonyl or phenylsulfonyl,
$R^4$ is hydrogen, cyano, $C_1$-$C_4$-alkoxy which may be hydroxyl- or $C_1$-$C_4$-alkoxy-substituted, $C_1$-$C_4$-alkoxycarbonyl, aminocarbonyl or mono- or di-$C_1$-$C_4$-alkylaminocarbonyl,
$R^5$ is hydrogen, C-$C_4$-alkyl or $C_1$-$C_4$-alkoxy, which may each be hydroxyl-, $C_1$-$C_4$-alkoxy- or $C_1$-$C_4$-alkanoyloxy-substituted, $C_1$-$C_4$-alkanoyloxy which may be hydroxyl-, chlorine-, cyano-, $C_1$-$C_4$-alkoxy- or phenoxy-substituted, $C_1$-$C_6$-alkanoylamino which may be hydroxyl-, chlorine-, cyano-, $C_1$-$C$-alkoxy-, phenoxy- or $C_1$-$C_4$-alkanoyloxy-substituted, benzoylamino which may be chlorine-, cyano-, nitro-, $C_1$-$C_4$-alkyl-, $C_1$-$C_4$-alkoxy-, $C_1$-$C_4$-alkoxycarbonyl- or $C_1$-$C_4$-alkylsulfonyl-substituted, or $C_1$-$C_4$-alkoxycarbonyloxy, or di-$C_1$-$C_4$-alkylaminocarbonyloxy where the alkyl groups may be linked to one another to form a 6- or 7-membered ring containing the nitrogen atom of the amino group,
$R^6$ is hydrogen, $C_1$-$C_{10}$-alkyl whose carbon chain may be interrupted by one to three oxygen atoms in ether function and which may be hydroxy-, halogen-, cyano-, $C_1$-$C_4$-alkanoyloxy- or $C_1$-$C_4$-alkoxycarbonyl-substituted, or $C_3$-$C_5$-alkenyl which may be substituted by hydroxyl, halogen, $C_1$-$C_4$-alkoxy or $C_1$-$C_4$-alkanoyloxy,
$R^7$ is hydrogen, halogen, cyano, alkyl $R^6$ of the type defined, $C_1$-$C_4$-alkoxy, amino or mono- or di-$C_1$-$C_4$-alkylamino, and
$R^8$ has one of the meanings of $R^7$,
and to the use thereof as disperse dyes for dyeing textile material.

Dyes which are to be used for dyeing textile material must not only exhibit a high color strength but also have high light fastness and high fastness to dry heat setting and pleating. At the same time, in particular if deep shades are to be produced, high affinity for the fiber is indispensable.

DE-A-39 02 005 describes thiopheneazo dyes having coupling components based on monophenylamine. EP-A-201 896, EP-A-237 910, DE-A-35 29 831 and DE-A-35 35 133 disclose thiopheneazo dyes in general. However, dyes which contain diphenylamine as coupling component are not expressly mentioned.

It is an object of the present invention to provide novel thiopheneazo dyes which have advantageous application properties and with which it is possible to obtain particularly intense blue dyeings.

We have found that this object is achieved by the thiopheneazo dyes I defined at the beginning.

We have also found that the thiopheneazo dyes I &re advantageously usable for dyeing textile material.

Preferred embodiments of the invention are revealed in the subclaims.

A particularly preferred $R^1$ is cyano. It may also be $C_1$-$C_4$-alkoxycarbonyl such as propoxy, isopropoxy and butoxycarbonyl, but in particular methoxycarbonyl or ethoxycarbonyl.

Halogen $R^2$ is preferably bromine or in particular chlorine.

The following groups may also be used as $R^2$:
$C_1$-$C_6$-alkyl groups whose carbon chain may be interrupted by one or two oxygen atoms in ether function, such as pentyl, isopentyl, sec-pentyl, tert-pentyl, hexyl and 2-methylpentyl, preferaby butyl; isobutyl, sec-butyl and tert-butyl and particularly preferably methyl, ethyl, propyl and isopropyl, but also methoxyethyl, ethoxyethyl, methoxypropyl and ethoxypropyl;
$C_1$-$C_6$-alkoxy groups with or without phenyl as substituent, such as pentyloxy, isopentyloxy, neopentyloxy, hexyloxy, benzyloxy and 2-phenylethoxy, preferably methoxy, ethoxy, propoxy, isopropoxy, butoxy, isobutoxy and sec-butoxy;
$C_1$-$C_6$-alkylthio groups with or without phenyl as substituent, such as methylthio, ethylthio, propylthio, isopropylthio, butylthio, pentylthio, hexylthio, benzylthio and 2-phenylethylthio;
a phenylthio group or a phenylsulfonyl group which are each preferred in unsubstituted form but may also carry halogen, $C_1$-$C_4$-alkyl or C-$C_4$-alkoxy as substituents, examples being -S-Ph-4-Cl and -$SO_2$-Ph-4-$CH_3$, where Ph=phenyl.

$R^3$ is preferably cyano, but may also be $C_1$-$C_4$-alkanoyl such as acetyl, propionyl, butyryl, isobutyryl or very particularly formyl. $R^3$ may further be benzoyl or phenylsulfonyl or $C_1$-$C_4$-alkylsulfonyl such as methyl-, ethyl-, propyl-, isopropyl- and butylsulfonyl.

Particularly preferred radicals $R^4$ are hydrogen and the $C_1$-$C_4$-alkoxy groups which were mentioned for $R^2$ and which may additionally carry hydroxyl or $C_1$-$C_4$-alkoxy as substituents, such as —O—$(CH_2)_2$—OH, —O—$(CH_2)_3$—OH, —[O—$(CH_2)_2]_2$—OH, —O—$CH_2$—CH(OH)—$CH_2$(OH)—O—$CH_3$, —O—$CH_2$—CH(OH)—$CH_2$—O—$C_4H_9$, —O—$(CH_2)_2$—O—$CH_3$, —O—$(CH_2)_2$—O—$C_2H_5$, —O—$(CH_2)_2$—O—$C_3H_7$, —O—$(CH_2)_2$—O—$C_4H_9$, —O—$(CH_2)_3$—O—$CH_3$, —O—$(CH_2)_3$—O—$C_2H_5$, —O—$(CH_2)_3$—O—$C_3H_7$ and —O—$(CH_2)_3$—O—$C_4H_9$.

Preferred radicals $R^4$ are the $C_1$-$C_4$-alkoxycarbonyl groups mentioned for $R^1$. $R^4$ may also be cyano and aminocarbonyl or mono- or di-$C_1$-$C_4$-alkylaminocarbonyl such as methylaminocarbonyl, ethylaminocarbonyl, propylaminocarbonyl, isopropyidminocarbonyl or butylaminocarbonyl or else dimethylaminocarbonyl, methylethylaminocarbonyl, diethylaminocarbonyl or diisopropylaminocarbonyl.

$R^5$ may be not only hydrogen but also one of the following groups:

$C_1$-$C_4$-alkyl groups which may carry hydroxyl, $C_1$-$C_4$-alkoxy or $C_1$-$C_4$-alkanoyloxy as substituents, such as the $C_1$-$C_4$-alkyl groups mentioned for $R^2$ and —(CH$_2$)$_2$—O—CO—CH$_3$ and —(CH$_2$)$_3$—O—CO—C$_2$H$_5$;

$C_1$-$C_4$-alkoxy groups which may carry hydroxyl, alkoxy or alkanoyloxy as substituents, such as the alkoxy groups mentioned for $R^2$ and $R^4$ and —O—(CH$_2$)$_2$—O—CO—CH$_3$, —O—CH$_2$—CH(O—CO—CH$_3$)—CH$_2$—O—CH$_3$ and —O—(CH$_2$)$_3$—O—CO—CH$_3$, of which the $C_1$-$C_2$-alkoxy groups are particularly preferred;

particularly preferred C-C$_4$-alkanoyloxy groups which are preferably unsubstituted, such as - formyloxy, propionyloxy and butyryloxy, in particular acetyloxy, but which may also be substituted by hydroxyl, chlorine, cyano, phenoxy or particularly $C_1$-$C_4$-alkoxy, e.g.: —O—CO—CH$_2$—OH, —O—CO—CH$_2$-Cl, —O—CO—CH$_2$—CN, —O—CO—CH$_2$—O—Ph and —O—CO—CH$_2$—O—CH$_3$;

$C_1$-$C_6$-alkanoylamino groups which are preferably unsubstituted, such as pentanoylamino, preferably formylamino and butyrylamino, and also particularly preferably acetylamino and propionylamino, but which may also be substituted by hydroxyl, chlorine, cyano, in particular $C_1$-$C_4$-alkoxy, as well as phenoxy or $C_1$-$C_4$-alkanoyloxy, e.g.: —NH—CO—CH$_2$—OH, —NH—CO—CH$_2$-Cl, —NH—CO—CH$_2$-CN, —NH—CO—CH$_2$—O—CH$_3$, —NH—CO—CH$_2$—O—C$_2$H$_5$, —NH—CO—(CH)$_2$—O—CH$_3$, —NH—CO—(CH$_2$)$_4$—O—CH$_3$, —NH—CO—CH$_2$—O—Ph and —NH—CO—CH$_2$—O—CO-CH$_3$;

a benzoylamino group which is preferably unsubstituted but which may also be substituted by chlorine, cyano, nitro, $C_1$-$C_4$-alkyl, $C_1$-$C_4$-alkoxy, $C_1$-$C_4$-alkoxycarbonyl or $C_1$-$C_4$-alkylsulfonyl, such as —NH—CO—Ph, —NH—CO—Ph—4—Cl, —NH—CO—Ph—4—CN, —NH—CO—Ph—4—NO$_2$, —NH—CO—Ph—2—CH$_3$, —NH—CO—Ph—4—O—CH$_3$, —NH—CO—Ph—3—CO—O—CH$_3$— and —NH—CO—Ph—4—SO$_2$—CH$_3$;

$C_1$-$C_4$-alkoxycarbonyloxy groups such as —O—CO—OCH$_3$, —O—CO—OC$_2$H$_5$, —O—CO—OC$_3$H$_7$, —O—CO—OCH(CH$_3$)$_2$, —O—CO—OC$_4$H$_9$, —O—CO—OCH$_2$—CH(CH$_3$)$_2$ and —O—CO—OC(CH$_3$)$_3$;

particularly preferably di-$C_1$-$C_4$-alkylaminocarbonyloxy groups whose alkyl moieties may also be linked to one another to form a 6- or 7-membered ring containing the nitrogen atom of the amino group, such as —O—CO—N(CH$_3$)$_2$, —O—CO—N(C$_2$H$_5$)$_2$, —O—CO—N(C$_3$H$_7$)$_2$, —O—CO—N[CH(CH$_3$)$_2$]$_2$, —O—CO—N(C$_4$H$_9$)$_2$, —O—CO—N[CH$_2$—CH(CH$_3$)$_2$]$_2$, —O—CO—N[C(CH$_3$)$_3$]$_2$,

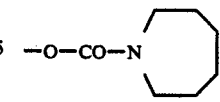

-continued

A particularly preferred meaning of $R^6$ is hydrogen. Other suitable possibilities are:

$C_1$-$C_{10}$-alkyls such as heptyl, octyl, 2-ethylhexyl, nonyl, decyl and branched radicals of this kind, preferably pentyl, isopentyl, sec-pentyl, tert-pentyl, hexyl and 2-methylpentyl, and particularly preferably methyl, ethyl, propyl, isopropyl, butyl, isobutyl, sec-butyl and tert-butyl, where the straight-chain alkyls are preferred and in each case the carbon chain may be interrupted by oxygen atoms in ether function and the groups halogen, cyano, $C_1$-$C_4$alkoxycarbonyl and preferably hydroxyl or $C_1$-$C_4$-alkanoyloxy may be present as substituents; examples being in particular —(CH$_2$)$_2$O—CH$_3$ and —(CH$_2$)$_2$O—C$_2$H$_5$, but also —(CH$_2$)$_2$—O—C$_3$H$_7$, —(CH$_2$)$_2$—O—C$_4$H$_9$, —(CH$_2$)$_3$—O—CH$_3$, —(CH$_2$)$_3$—O—C$_2$H$_5$, —CH$_2$—CH(CH$_3$)—O—CH$_3$, —CH$_2$—CH(CH$_3$)—O—C$_2$H$_5$, —(CH$_2$)$_4$—O—CH$_3$, —(CH$_2$)$_4$—O—C$_2$H$_5$, —CH$_2$—CH(CH$_2$H$_5$)—O—CH$_3$, —CH$_2$CH(C$_2$H$_5$)—O—C$_2$H$_5$, —[(CH$_2$)$_2$—O]$_2$—CH$_3$, —[(CH$_2$)$_2$—O]$_2$—C$_2$H$_5$, —[(CH$_2$)$_2$—O]$_3$—CH$_3$, —[(CH$_2$)$_2$—O]$_4$—CH$_3$, —[(CH$_2$)$_3$—O]$_2$—CH$_3$ and —[(CH$_2$)$_3$—O]$_2$—C$_2$H$_5$, (CH$_2$)$_2$—CN, —(CH$_2$)$_3$—CN, —(CH$_2$)$_2$-Cl, —CH$_2$-CH(Br)—CH$_3$, (CH$_2$)$_2$—CO—O—C$_2$H$_5$, —(CH$_2$)$_3$—OH, —(CH$_2$)$_4$—OH and —CH$_2$—CH(C$_2$H$_5$)—OH but also in particular —(CH$_2$)$_2$—OH, —(CH$_2$)$_2$—O—CO—CH$_3$ and —(CH$_2$)$_2$—O—CO—C$_2$H$_5$;

$C_3$-$C_5$-alkenyl, preferably unsubstituted or else substituted by hydroxyl, halogen, $C_1$-$C_4$-alkoxy or $C_1$-$C_4$-alkanoyloxy, the preference here being for —CH(CH$_3$)—CH=CH$_2$, —CH$_2$—CH=CH—CH$_3$, —CH$_2$—CH=CH—CH$_2$—CH$_3$, in particular —CH$_2$—CH=CH$_2$ or also for example —CH$_2$—CH=CH—CH$_2$OH, —CH$_2$—CH=CH—Cl, —CH$_2$—CH=CH—CH$_2$Cl, —CH$_2$—CH=CH—CH$_2$—O—CH$_3$ and —CH$_2$—CH=CH—CH$_2$—O—CO—CH$_3$.

$R^7$ and in particular $R^8$ are each preferably hydrogen. Preferred halogen is chlorine or bromine. It is also possible to use cyano and the $C_1$-$C_{10}$-alkyl groups mentioned above for $R^6$, of which the unsubstituted or hydroxyl-substituted $C_1$-$C_4$-alkyl groups are particularly preferred. Particular preference is similarly given to the $C_1$-$C_4$-alkoxy groups mentioned for $R^5$. Other possibilities are amino and mono- or di-$C_1$-$C_4$-alkylamino such as methylamino, ethylamino, propylamino, isopropylamino and butylamino and also dimethylamino, diethylamino, diisopropylamino and methylethylamino.

Thiopheneazo dyes I according to the present invention can be prepared in a conventional manner, for example by diazotizing an aminothiophene derivative of the general formula II

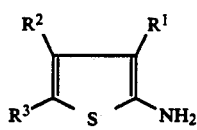

II and coupling the diazonium salt with a diphenylamine derivative of the general formula III

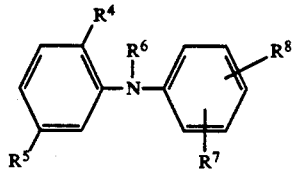

III

The starting compounds II and III are known or can be prepared by known methods (EP-A-193 885, DE-A-16 44 052, 17 19 060, 21 09 756 and 30 04 654).

A further method of preparing the thiopheneazo dyes I is, similarly to the method described for example in EP-A-237 910, to couple the diazotized aminothiophene derivative to a benzene derivative of the formula IV

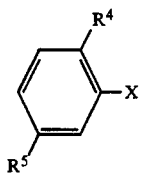

IV where X is a leaving group such as —Cl, —PH—SO$_3$— or —O—R$^9$ (R$^9$ preferably being C$_1$-C$_6$-alkyl which may be hydroxyl- or alkoxy-substituted, C$_1$-C$_4$-alkanoyl, phenylsulfonyl or p-nitrophenylsulfonyl). The leaving group X is then displaced in a nucleophilic substitution reaction by the aniline derivative of the formula V

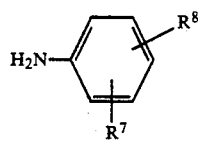

V

The thiopheneazo dyes I according to the present invention are advantageously suitable for use as dispersent dyes for dyeing textile material, in particular polyesters, but also cellulose esters, polyamides or blend fabrics of polyesters and cellulose fibers.

To obtain a favorable color buildup, it may in some cases be of advantage to use mixtures of dyes I.

The thiopheneazo dyes I are noteworthy for high affinity and, applied by the commonly known high-temperature dyeing methods, produce in particular on polyesters violet, blue or navy dyeings of high color strength with very good fastness properties, in particular good light fastness and fastness to dry heat setting and pleating.

EXAMPLES

Preparation and use of thiopheneazo dyes Ia

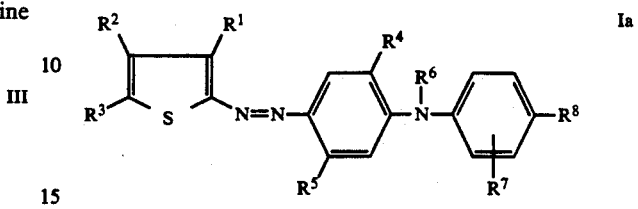

Ia

EXAMPLE 1

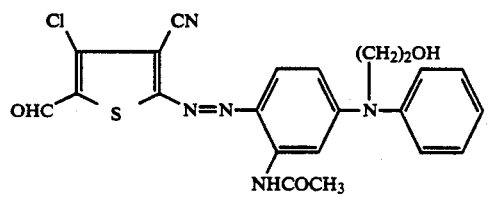

9.4 g (0.05 mol) of 2 amino-3-cyano-4-chloro-5-formylthiophene were suspended in 60 ml of 85% strength by weight sulfuric acid at a temperature of not more than 30° C. 16.6 g of nitrosyl sulfuric acid (11.5% by weight of N$_2$O$_3$) were added dropwise at 0°-5° C. in the course of 0.5 h. The mixture was then stirred at that temperature for a further 2 h.

The diazonium salt solution thus obtained was slowly added dropwise at 0°-5° C. to a solution of 13.5 g (0.05 mol) of N-phenyl-N-2-hydroxyethyl-3-acetaminoaniline in 25 ml of N,N-dimethylformamide, 100 ml of water, 20 ml of dilute hydrochloric acid, 0.5 g of sulfamic acid and 300 g of ice.

The precipitated dye was then filtered off, washed neutral and dried. The amount obtained thereof was 21.7 g, which corresponds to a yield of 83%.

Then the dye was used to dye a polyester staple fiber fabric by the high-temperature dyeing method.

To this end the dye was dissolved in dimethylformamide and the solution was added to an aqueous dyeing liquor which had been acidified with acetic acid.

In this dyebath the sample of polyester was dyed according to the following stepwise temperature profile: first a few min at 50°-60° C., then heating up to 120°-140° C. in the course of 30 min, then a further 90 min at that temperature.

The subsequently conventionally washed and reduction cleared polyester sample exhibited a fast navy dyeing.

The dyes Ia shown below in Table 1 were prepared in similar yields by the method of Example 1 and likewise tested in respect of their dyeing properties, again by the method of Example 1.

TABLE 1

Structure Ia:

Thiophene ring with R¹, R², R³ substituents, linked by N=N to benzene ring with R⁴, R⁵ substituents, with N(R⁶) group connected to another phenyl ring with R⁷, R⁸ substituents.

| Ex. | R¹ | R² | R³ | R⁴ | R⁵ | R⁶ | R⁷ | R⁸ | Hue on polyester |
|---|---|---|---|---|---|---|---|---|---|
| 2 | —CN | —S—C₂H₅ | —CHO | —H | —NH—CO—C₂H₅ | —H | —H | —CH₃ | blue |
| 3 | —CN | —Cl | —CHO | —H | —NH—CO—CH₃ | —C₂H₅ | —H | —H | navy |
| 4 | —CN | —Cl | —CHO | —H | —O—CO—CH₃ | —H | 2-CH₃ | —H | bluish violet |
| 5 | —CN | —Cl | —CHO | —H | —O—CO—C₂H₅ | —H | 2-CH₃ | —H | bluish violet |
| 6 | —CN | —Cl | —CHO | —H | —O—CH₃ | —H | 2-CH₃ | —H | navy |
| 7 | —CN | —Cl | —CHO | —H | —NH—CO—CH₃ | —H | —H | —H | navy |
| 8 | —CN | —Br | —CHO | —H | —NH—CO—CH₃ | —CH₂—CH(OH)—C₂H₅ | —H | —H | blue |
| 9 | —CN | —Cl | —CHO | —H | —NH—CO—CH₃ | —H | —H | —H | blue |
| 10 | —CN | —Cl | —CHO | —H | —NH—CO—CH₃ | —(CH₂)₂—O—CO—CH₃ | —H | —H | bluish violet |
| 11 | —CN | —Cl | —CHO | —H | —NH—CO—C₂H₅ | —(CH₂)₂—OH | —H | —H | blue |
| 12 | —CN | —Cl | —CN | —H | —NH—CO—CH₃ | —(CH₂)₂—OH | —H | —H | navy |
| 13 | —CN | —Cl | —CHO | —H | —NH—CO—CH₃ | —(CH₂)₂—OH | —H | —H | navy |
| 14 | —CN | —Cl | —CHO | —H | —NH—CO—C₃H₇ | —C₄H₉ | —H | —H | blue |
| 15 | —CN | —Cl | —CHO | —H | —NH—CO—CH₃ | —H | —H | —Cl | blue |
| 16 | —CN | —Cl | —CHO | —H | —O—CH₃ | —H | 2-CH₃ | —H | violet |
| 17 | —CN | —Cl | —CN | —H | —NHCOCH₃ | —(CH₂)₂—OH | —H | —H | violet |
| 18 | —CO—O—C₂H₅ | —O—C₂H₅ | —CHO | —H | —NH—CO—CH₃ | —(CH₂)₂—OH | —H | —H | violet |
| 19 | —CN | —S-Ph | —CHO | —H | —NH—CO—C₂H₅ | —C₂H₅ | —H | —H | blue |
| 20 | —CN | —SO₂-Ph | —CHO | —H | —NH—CO—C₂H₅ | —(CH₂)₂—O—C₂H₅ | —H | —H | blue |
| 21 | —CN | —S—CH₃ | —CHO | —H | —NH—CO—C₄H₉ | —H | —H | —CH₃ | blue |
| 22 | —CN | —SO₂-Ph | —CHO | —H | —NH—CO—CH₃ | —H | —H | —C₂H₅ | violet |
| 23 | —CN | —SO₂-Ph | —CHO | —H | —O—CH₃ | —H | 2-CH₃ | —H | greenish blue |
| 24 | —CN | —S—CH₃ | —CHO | —H | —NH—CO—CH₃ | —CH(CH₃)— | —H | —H | blue |
| 25 | —CN | —Cl | —CHO | —H | —NH—CO—CH₃ | —H | —H | —H | blue |
| 26 | —CN | —Cl | —CHO | —H | —NH—CO—CH₃ | —(CH₂)₂—O—CO—CH₃ | —H | —H | blue |
| 27 | —CN | —Cl | —CHO | —H | —NH—CO—CH₃ | —CH₃ | —H | —H | blue |
| 28 | —CN | —Cl | —CHO | —H | —NH—CO—C₂H₅ | —(CH₂)₂—OH | —H | —H | blue |
| 29 | —CN | —Cl | —CHO | —H | —NH—CO—CH₃ | —(CH₂)₂—O—C₂H₅ | 3-CH₃ | —H | blue |
| 30 | —CN | —Cl | —CHO | —H | —NH—CO—CH₃ | —CH₂—CH=CH₂ | —H | —H | blue |
| 31 | —CN | —Cl | —CHO | —H | —NH—CO—CH₃ | —(CH₂)₂—OH | —H | —O—CH₃ | blue |
| 32 | —CN | —Cl | —CHO | —H | —NH—CO—CH₃ | —(CH₂)₂—OH | 3-OCH₃ | —H | blue |
| 33 | —CN | —Cl | —CHO | —H | —NH—CO—CH₃ | —C₃H₇ | —H | —H | blue |
| 34 | —CN | —Cl | —CHO | —H | —NH—CO—CH₃ | —H | —H | —CH₃ | blue |
| 35 | —CN | —Cl | —CN | —CN | —NH—CO—CH₃ | —H | —H | —H | blue |
| 36 | —CN | —Cl | —CHO | —CO—NH₂ | —NH—CO—CH₃ | —H | —H | —O—C₂H₅ | blue |
| 37 | —CN | —Cl | —CHO | —CO—NH₂ | —NH—CO—CH₃ | —H | —H | —H | blue |
| 38 | —CN | —Cl | —CHO | —H | —O—CH₃ | —C₂H₅ | —H | —H | navy |
| 39 | —CN | —Cl | —CHO | —H | —NH—CO—C₂H₅ | —(CH₂)₂—OH | 2-CH₃ | —H | bluish violet |
| 40 | —CO—O—C₂H₅ | —Cl | —CHO | —H | —NH—CO—CH₃ | —(CH₂)₂—O—CO—C₂H₅ | —H | —H | violet |
| 41 | —CO—O—C₂H₅ | —Cl | —CHO | —H | —NH—CO—CH₃ | —H | —H | —O—CH₃ | navy |
| 42 | —CO—O—C₂H₅ | —Cl | —CHO | —H | —NH—CO—CH₃ | —(CH₂)₂—OH | 3-OCH₃ | —O—C₂H₅ | navy |
| 43 | —CN | —Cl | —CHO | —H | —NH—CO—CH₃ | —(CH₂)₂—OH | —H | —H | navy |

TABLE 1-continued

Ia

| Ex. | R¹ | R² | R³ | R⁴ | R⁵ | R⁶ | R⁷ | R⁸ | Hue on polyester |
|---|---|---|---|---|---|---|---|---|---|
| 44 | —CN | —SO₂-Ph | —CHO | —H | —NH—CO—CH₃ | —(CH₂)₂—OH | —H | —H | navy |
| 45 | —CN | —SO₂-Ph | —CHO | —H | —NH—CO—CH₃ | —H | —H | —H | blue |
| 46 | —CN | —S—CH₃ | —CHO | —H | —NH—CO—CH₃ | —H | —H | —H | blue |
| 47 | —CN | —Cl | —CN | —H | —NH—CO—CH₃ | —H | —H | —O—CH₃ | blue |
| 48 | —CN | —Cl | —CN | —H | —NH—CO—CH₃ | —H | —H | —O—CH₃ | blue |
| 49 | —CN | —Cl | —CHO | —H | —NH—CO—CH₃ | —H | —H | —H | blue |
| 50 | —CN | —O—C₂H₅ | —CHO | —H | —NH—CO—CH₃ | —(CH₂)₂—OH | —H | —H | blue |
| 51 | —CN | —SO₂—CH₃ | —CHO | —H | —NH—CO—CH₃ | —H | —H | —H | blue |
| 52 | —CN | —SO₂—CH₃ | —CHO | —H | —NH—CO—C₂H₅ | —(CH₂)₂—OH | —H | —O—C₂H₅ | bluish violet |
| 53 | —CN | —Cl | —CHO | —H | —O—C₂H₅ | —(CH₂)₂—OH | —H | —O—CH₃ | reddish blue |
| 54 | —CN | —Cl | —CN | —H | —O—C₄H₉ | —H | 3-CH₃ | —O—C₂H₅ | reddish blue |
| 55 | —CN | —O—C₂H₅ | —CHO | —H | —O—(CH₂)₂—OH | —H | 2-CH₃ | —O—CH₃ | reddish blue |
| 56 | —CN | —Cl | —CN | —H | —O—(CH₂)₂—OH | —H | —H | —C₂H₅ | reddish navy |
| 57 | —CN | —Cl | —CHO | —H | —O—(CH₂)₂—O—CO—CH₃ | —(CH₂)₂—O—CO—CH₃ | —H | —CH₃ | reddish navy |
| 58 | —CN | —CH₃ | —CN | —H | —O—CO—O—CH₃ | —(CH₂)₂—O—CO—CH₃ | —H | —H | reddish blue |
| 59 | —CN | —Cl | —CHO | —H | —O—CO—N(CH₃)₂ | —H | 2-CH₃ | —CH₃ | reddish blue |
| 60 | —CN | —Cl | —CHO | —H | —O—CO—N(C₂H₅)₂ | —(CH₂)₂—OH | —H | —O—C₂H₅ | blue |
| 61 | —CO—O—CH₃ | —Cl | —CN | —H | —NH—CO—CH₃ | —H | —H | —H | blue |
| 62 | —CO—O—CH₃ | —Cl | —CHO | —H | —NH—CO—CH₃ | —(CH₂)₂—OH | —H | —O—CH₃ | blue |
| 63 | —CO—O—CH₃ | —Cl | —CN | —H | —NH—CO—C₂H₅ | —(CH₂)₂—OH | —H | —H | blue |
| 64 | —CN | —CH(CH₃)₂ | —CN | —H | —O—CO—N(C₃H₇)₂ | —(CH₂)₂—OH | —H | —O—C₂H₅ | blue |
| 65 | —CN | —CH₃ | —CHO | —H | —NH—CO—CH₃ | —(CH₂)₂—OH | —H | —H | blue |
| 66 | —CN | —CH₃ | —CHO | —H | —NH—CO—CH₃ | —(CH₂)₂—OH | —H | —Cl | blue |
| 67 | —CN | —C₂H₅ | —CN | —H | —NH—CO—CH₃ | —(CH₂)₂—OH | —H | —H | blue |
| 68 | —CN | —CH₃ | —CN | —H | —O—CO—N(piperidine) | —(CH₂)₂—OH | —H | —H | blue |
| 69 | —CN | —(CH₂)₂—O—CH₃ | —CN | —H | —NH—CO—C₂H₅ | —(CH₂)₂—OH | —H | —H | blue |

EXAMPLE 70

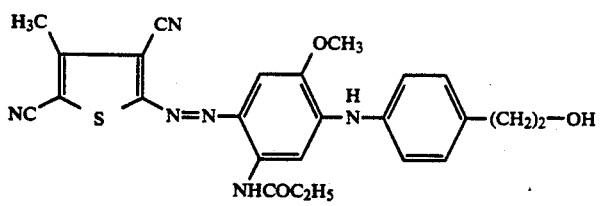

A solution of 3.8 g (0.01 mol) of 2-(2'-propionylamino-4',5'-dimethoxyphenylazo)-3-cyano-4-methyl-5-cyanothiophene and 2.1 9 (0.015 mol) of p-(2-hydroxyethyl)aniline in 100 ml of N-methylpyrrolidone was heated to 120° C. and stirred at that temperature for 6 hours.

After cooling down, the reaction mixture was poured onto 500 ml of water. The precipitated dye was filtered off, washed neutral and dried.

This gave 4.0 g of dye, which corresponds to a yield of 82%; melting point: 103° C.; $\lambda_{max}$=604 nm (acetone).

Using the high-temperature process described in Example 1 a fast dark blue dyeing was obtained with the dye on polyester staple fiber fabric.

The dyes Ib listed in Table 2 were prepared by the method of Example 70 in similar yields and likewise investigated in respect of their dyeing characteristics.

TABLE 2

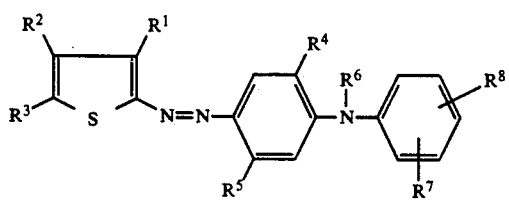

Ib

| Ex. | $R^2$ | $R^3$ | $R^4$ | $R^5$ | $R^7$ | $R^8$ | Hue on polyester |
|-----|-------|-------|-------|-------|-------|-------|------------------|
| 71 | —CH₃ | —CN | —O—CH₃ | —NH—CO—CH₃ | —H | —O—C₂H₅ | blue |
| 72 | —CH₃ | —CN | —O—C₂H₅ | —NH—CO—CH₃ | —H | —O—C₂H₅ | blue |
| 73 | —CH₃ | —CN | —O—CH₃ | —NH—CO—CH₃ | —H | —O—(CH₂)₂—OH | blue |
| 74 | —Cl | —CN | —O—(CH₂)₂—OH | —NH—CO—CH₃ | —H | —O—C₂H₅ | blue |
| 75 | —Cl | —CN | —O—CH₃ | —NH—CO—CH₃ | —H | —(CH₂)₂—OH | blue |
| 76 | —Cl | —CHO | —O—CH₃ | —NH—CO—C₂H₅ | —H | —(CH₂)₂—OH | blue |
| 77 | —Cl | —CHO | —O—C₂H₅ | —NH—CO—CH₃ | —H | —(CH₂)₂—OH | blue |
| 78 | —Cl | —CHO | —O—CH₃ | —NH—CO—CH₃ | —H | —O—C₂H₅ | greenish blue |
| 79 | —Cl | —CHO | —CO—O—CH₃ | —NH—CO—CH₃ | 3-O—CH₃ | —O—CH₃ | blue |

We claim:

1. A thiopheneazo dye of the general formula I in which the substituents have the following meanings:
$R^1$ is cyano;
$R^2$ is chlorine, bromine or $C_1$-$C_4$-alkyl,
$R^3$ is cyano or formyl,
$R^4$ is hydrogen,
$R^5$ is $C_1$-$C_2$- alkoxy which may be hydroxyl-, $C_1$-$C_2$-alkoxy- or $C_1$-$C_2$-alkanoyloxy-substituted, or is $C_1$-$C_4$-alkanoyloxy or $C_1$-$C_4$-alkanoylamino which may each be substituted by hydroxyl, cyano or $C_1$-$C_4$-alkoxy, or is di-$C_1$-$C_4$-alkylaminocarbonyloxy, $R^4$ is hydrogen, $C_1$-$C_8$-alkyl whose carbon chain may be interrupted by one or two oxygen atoms in ether function and which may be hydroxyl- or $C_1$-$C_4$-alkanoyloxy-substituted, or $C_3$-$C_5$-alk-2-en-1-yl which may be substituted by hydroxyl or chlorine,
$R^7$ is hydrogen, halogen, $C_1$-$C_4$-alkyl which may be hydroxyl-substituted or $C_1$-$C_4$-alkoxy, and
$R^8$ has one of the aforementioned meanings of $R^7$.

2. A thiopheneazo dye of the general formula I of claim 1, in which the substituents have the following meanings:
$R^1$ is cyano;
$R^2$ is chlorine or $C_1$-$C_3$-alkyl,
$R^3$ is cyano or formyl,
$R^4$ is hydrogen;
$R^5$ is $C_1$-$C_2$-alkoxy which may be hydroxyl-, $C_1$-$C_2$-alkoxy- or $C_1$-$C_2$-alkanoyloxy-substituted, or is $C_1$-$C$-alkanoyloxy or $C$-$C_4$-alkanoylamino which may each be substituted by $C$-$C_4$-alkoxy, or is di-$C_1$-$C_4$-alkylaminocarbonyloxy,
$R^6$ is hydrogen or $C_1$-$C_4$-alkyl whose carbon chain may be interrupted by one oxygen atom in ether function and which may be substituted by hydroxyl,
$R^7$ is hydrogen, chlorine, bromine, $C_1$-$C_4$-alkyl which may be hydroxyl-substituted or $C_1$-$C_4$-alkoxy, and
$R^8$ is hydrogen.

3. A method for dyeing textile material, which comprises applying thereto a thiopheneazo dye of the general formula I as claimed in claim 1 as disperse dye.

4. A method of dyeing polyester, which comprises applying thereto a thiopheneazo dye of the general formula I as claimed in claim 1.

* * * * *

UNITED STATES PATENT AND TRADEMARK OFFICE
CERTIFICATE OF CORRECTION

PATENT NO. : 5,270,456
DATED : December 14, 1993
INVENTOR(S) : Erwin Hahn et al.

It is certified that error appears in the above-indentified patent and that said Letters Patent is hereby corrected as shown below:

On the title page,

Item [54] and Column 1, Line 2,

The title should read: --AZO DYES WITH A 2-AMINOTHIOPHENE DYE AZO COMPONENT AND A COUPLING COMPONENT OF THE DIPHENYLAMINE SERIES--

Item [75], The sixth inventor's name should read:

--Sabine Gruettner--

Signed and Sealed this

Thirty-first Day of May, 1994

*Attest:*

BRUCE LEHMAN

*Attesting Officer*     *Commissioner of Patents and Trademarks*